Nov. 1, 1960
G. NOWLIN ET AL
2,958,703
PREPARATION OF ORGANOMETAL COMPOUNDS
Filed Nov. 28, 1955
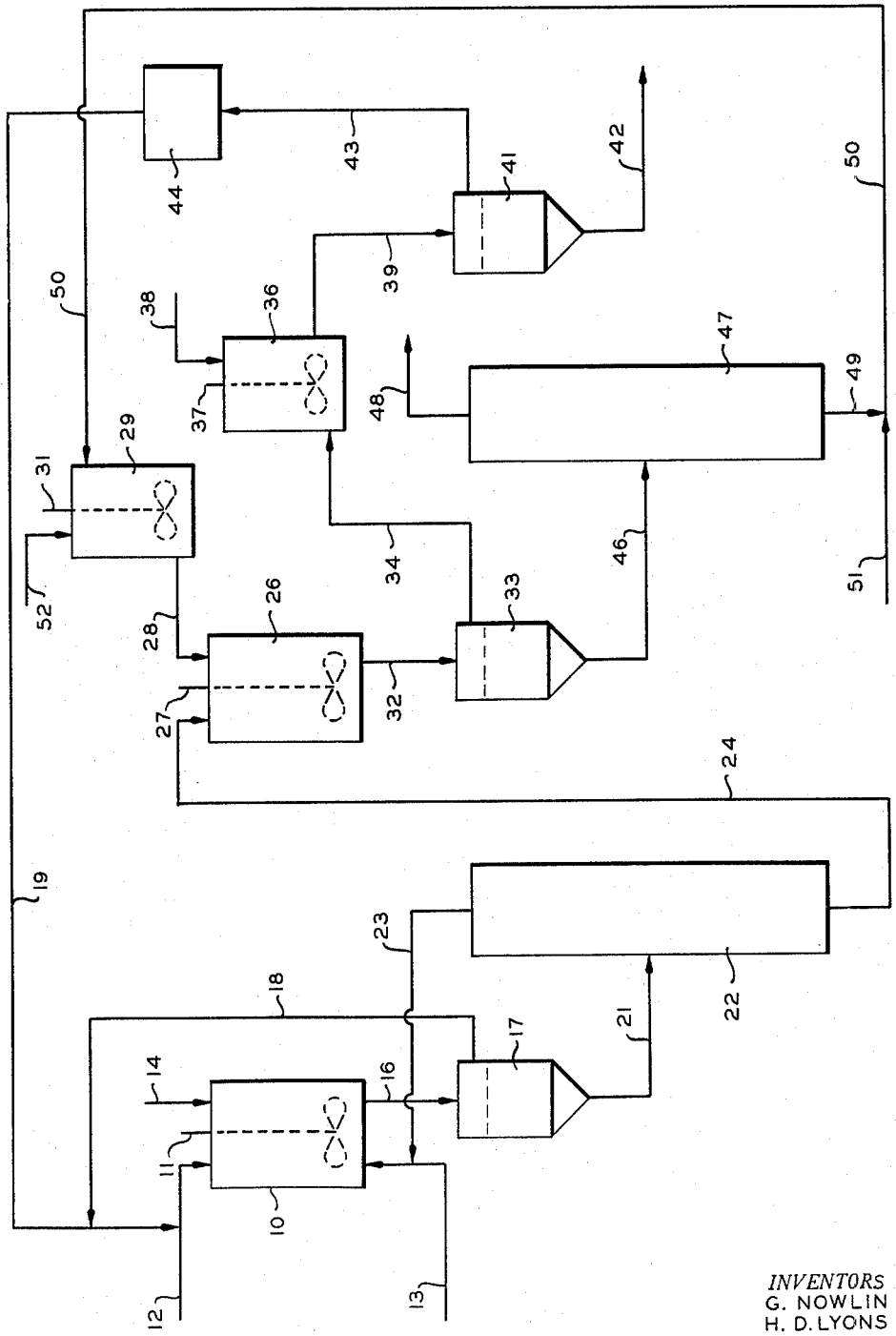
INVENTORS
G. NOWLIN
H. D. LYONS
BY *Hudson and Young*
ATTORNEYS

United States Patent Office 2,958,703
Patented Nov. 1, 1960

2,958,703

PREPARATION OF ORGANOMETAL COMPOUNDS

Gene Nowlin, Glen Burnie, Md., and Harold D. Lyons, Bartlesville, Okla., assignors to Phillips Petroleum Company, a corporation of Delaware Filed Nov. 28, 1955, Ser. No. 549,313

10 Claims. (Cl. 260—448)

This invention relates to the preparation of organometallic compounds. In one aspect, the invention relates to a continuous process for the preparation of organometals. In another aspect, the invention relates to a continuous process for the preparation of organometallic halides.

Organometals and organometallic halides are extensively employed in the synthesis of various types of organic compounds. Of particular significance is the use of these compounds as components of catalyst systems employed in the polymerization of monoolefins.

It is an object of this invention to provide an improved process for the preparation of organometallic compounds.

Another object of the invention is to provide a continuous process for the preparation of organometals.

A further object of the invention is to provide a continuous process for the preparation of organometallic halides.

Other and further objects and advantages of the invention will become apparent to one skilled in the art upon consideration of the accompanying disclosure.

The process of this invention is particularly applicable to the preparation of organometals corresponding to the formula $MR_x$, wherein M is a metal selected from the group consisting of aluminum, gallium, beryllium, indium and thallium, R is an alkyl radical, a cycloalkyl radical, an aryl radical, or combination of these radicals, e.g., aralkyl or alkaryl radicals, and $x$ is equal to the valence of the metal, i.e., 2 or 3. Examples of compounds corresponding to the formula $MR_x$, which can be prepared by the process of this invention are $Al(C_2H_5)_3$, $Al(C_3H_7)_3$, $Al(C_4H_9)_3$, $Al(C_6H_5)_3$, $Al(CH_3)_3$, $Be(CH_3)_2$, $Ga(C_3H_7)_3$, $In(CH_3)_3$, $Be(C_6H_5)_2$, $Al(C_6H_{13})_3$, $Al(C_{12}H_{25})_3$, $Ga(C_6H_5)_3$, $In(C_6H_5)_3$, $Tl(C_2H_5)_3$, $Tl(CH_3)_3$, $Al(C_6H_4 \cdot CH_3)_3$, tri-(3-methylcyclohexyl)aluminum, tri-(2-cyclohexylethyl)-gallium, di-(p-tolyl)beryllium, tri-(3-phenyl-1-methyl-proxyl)thallium, tri-[2-(3-isopropylcyclohexyl)ethyl]indium, and the like.

In a broad aspect, the continuous process of this invention comprises the following steps: (1) reacting one of the above-mentioned metals M with an organic halide to produce an organometal halide or mixture of organometal halides; (2) separating unreacted metal and organic halide from the reaction mixture of step 1 and recycling the unreacted metal and the organic halide, if desired, to step 1; (3) reacting the organometal halide or mixture of organometal halides from step 1 with a metal selected from the group consisting of alkali metals, magnesium, calcium and zinc or reacting said mixture with one of these metals and an organic halide; (4) separating an inorganic metal salt and the metal M, if formed, from the organometal compound formed in step 3 and recycling the metal M to step 1; and (5) purifying the organometal compound by any suitable means, such as by distillation.

A hydrocarbon is frequently used in the first and/or third steps of the process as described hereinabove. If such a hydrocarbon is present, it can be conveniently separated from the organometal compound by distillation. Suitable hydrocarbons for use in the process of this invention include paraffins, cycloparaffins and/or aromatics, which are relatively inert, non-deleterious and liquid under the conditions of the process. Examples of hydrocarbons which can be utilized are the octanes, the nonanes, the decanes, the hexadecanes, the heptadecanes, the octadecanes, cyclohexane, methylcyclohexane, benzene, toluene, xylene, and the like. Mixtures of any two or more of these hydrocarbons can also be employed in the process of this invention. Hydrocarbons which are preferred are those which have a boiling point above the boiling point of the organometal compound being recovered in order to facilitate separation of the product during distillation. For example, when the compound being purified or separated is triethylaluminum, it is preferred to use a hydrocarbon, such as hexadecane, which boils above 195° C. The hydrocarbons which may be used in step (1) of the process and in preparing the dispersions of finely divided metals, as described hereinafter, are solvents for the organometals, such as trialkylaluminum and related products, prepared in accordance with the process of this invention.

A more complete understanding of the invention may be obtained by referring to the drawing which is a flow diagram illustrating a preferred embodiment of the invention. While the invention will be described specifically with relation to the preparation of triethylaluminum, it is not intended to limit the invention to the preparation of this particular compound. It is to be understood that the invention is also applicable to the preparation of organometals corresponding to the formula $MR_x$ as discussed hereinabove. Furthermore, the process of this invention can be used as well to prepare organometallic halides corresponding to the formula $R_mMX_n$, wherein R and M are as described hereinbefore, X is a halogen, including fluorine, chlorine, bromine and iodine, and $m$ and $n$ are integers, the sum of $m$ and $n$ being equal to the valence of the metal M.

Referring now to the drawing, the entire system in initially purged with an inert gas such as purified nitrogen. There is provided also a means, not shown, whereby an atmosphere of nitrogen is maintained in the system during the practice of the process. Provision is made also for the operation of the system at atmospheric or superatmospheric pressure, whichever is the desired method of operation. Aluminum is initially charged to reactor 10, which is provided with a stirrer 11, through line 12. The aluminum so charged to reactor 10 is preferably in the form of turnings or shavings or other suitable form which will provide a large surface area. An organic halide, such as ethyl chloride, is introduced into reactor 10 through line 13, which is shown as being attached to the bottom portion of the reactor. If it is desired to carry out this step of the process in the presence of a hydrocarbon, the hydrocarbon in introduced into the reactor through line 14. It is often preferred, however, to utilize the liquid material which first forms as the medium for the reaction, and the organic halide is then introduced into the reactor below the surface of this material. At the commencement of charging of ingredients to the reactor, the stirrer is started and stirring is continued throughout the operation.

Material withdrawn from reactor 10 by means of line 16 contains a mixture of ethylaluminum dichloride and diethylaluminum chloride together with any unreacted aluminum and ethyl chloride. If a hydrocarbon solvent is used in reactor 10, the solvent is also present in the material withdrawn from the reactor. The material removed from reactor 10 is passed through line 16 into a separation means such as filter 17 which can advantageously be a rotary filter. In filter 17, the unreacted aluminum is separated and then recycled to line 12 by means of lines 18 and 19. The recycled aluminum is thereafter passed into reactor 10 along with fresh aluminum added to the reactor through line 12. After removal from the filter, the aluminum can be conveniently blown through a conduit or passed by means of a screw conveyor into the reactor. The remainder of the material is removed from filter 17 by means of line 21 and passed into stripper 22 where the organic halide is taken overhead and recycled to line 13 via line 23. The mixture of ethylaluminum dichloride and diethylaluminum chloride, together with any hydrocarbon which was used in reactor 10, is withdrawn from stripper 22 through line 24. This mixture is then introduced into reactor 26, which is provided with a stirrer 27.

A finely divided metal is charged to reactor 26 through line 28 simultaneously with the introduction of the ethylaluminum chlorides into the reactor. The finely divided metal utilized in reactor 26 can be any of the metals selected from the group consisting of alkali metals, magnesium, calcium and zinc. One convenient method for introducing the metal into reactor 26 is to form a dispersion of the metal in a suitable hydrocarbon such as those mentioned hereinabove. If a hydrocarbon was used in reactor 10, it is preferred to employ an identical hydrocarbon in the preparation of the metal dispersion. When an alkali metal is employed, this method of introduction is particularly suitable. The metal dispersion is prepared in vessel 29 which is provided with a stirrer 31. The materials introduced into reactor 26 are continuously stirred by means of stirrer 27.

The reaction mixture, which is removed from reactor 26 through line 32, contains triethylaluminum, a hydrocarbon, aluminum metal, and a metal halide, such as sodium chloride, if sodium is the metal which was charged to reactor 26. The reaction mixture withdrawn through line 32 is then passed to a separation means, such as filter 33, where the aluminum and sodium chloride are separated. The aluminum and sodium chloride, which are removed from the filter through line 34, are then passed to a treating vessel 36 provided with a stirrer 37. Cold water is added to vessel 36 through line 38, and the mixture is stirred. The contents of treating vessel 36 are transferred via line 39 to a separation means, such as filter 41, where the aluminum is separated from the aqueous solution of sodium chloride which is withdrawn from the filter through line 42. Aluminum, which has been freed from sodium chloride, is removed from the filter through line 43 and after passing through drier 44, is recycled through line 19 to line 12. The recycled aluminum is then passed into reactor 10 along with the aluminum added to the reactor through line 12.

The triethylaluminum dissolved in the hydrocarbon, which is removed from filter 33 through line 46, is passed into fractionator 47. In fractionator 47, triethylaluminum is distilled overhead through line 48 and then passed to suitable storage facilities. The hydrocarbon which boils at a higher temperature than triethylaluminum is withdrawn from the fractionator through line 49 and then recycled via line 50 to vessel 29 where it is used in the preparation of the metal dispersion. If step 1 of the process is to be carried out in the presence of a hydrocarbon corresponding to the hydrocarbon used in the preparation of the metal dispersion, a portion of the hydrocarbon withdrawn from the fractionator is recycled to line 14 for introduction into reactor 10. Line 51 provides means for introducing make-up hydrocarbon into vessel 29 while line 52 is for the introduction of finely divided metal into this same vessel.

The foregoing description covers the essential steps in the process for the production of triethylaluminum from ethyl chloride and aluminum. As will be obvious to one skilled in the art, numerous variations and modifications of the process can be practiced which come within the scope of the invention. Other organoaluminum compounds, with and without halogen, can be prepared by merely varying the feed to each of the reaction zones of the above described process.

The reaction of an organic halide with aluminum can be expressed by the following general equation:

$$3RX + 2Al \rightarrow R_2AlX + RAlX_2 \quad (1)$$

wherein R represents an alkyl, cycloalkyl, aryl or combinations of these radicals and X represents a halogen. It is noted that when beryllium is utilized in the reaction expressed by the above equation, the organoberyllium monohalide only is formed. When carrying out the process of this invention, the hydrocarbon radicals in the organic halides each generally contain no more than 20 carbon atoms and preferably less than 10 carbon atoms. The foregoing equation represents the reaction which takes place in the first step of the process as described above, i.e., the reaction occurring in reactor 10. Reactant materials are generally charged to this reactor in the stoichiometric proportions represented in the equation although from 90 to 110 percent of the theoretical amounts can be employed while still obtaining reasonably good yields.

The temperature in reactor 10 is generally maintained in the range of 90 to 200° C. while the pressure can vary from atmospheric up to, but generally not more than, 600 p.s.i.g. If the organic halide is gaseous at atmospheric pressure and at the temperature employed in reactor 10, it is preferred to operate at superatmospheric pressure. A pressure in the range of 300 to 500 p.s.i.g. is frequently employed. However, such a reaction can be effected at atmospheric pressure if the reactor is provided with the necessary condensing system. The rate at which the reactants are charged to reactor 10 will be such that the temperature and pressure are maintained within the above-mentioned ranges. This will obviously depend upon the type and size of reaction vessel as well as on the cooling means utilized. Conditions in this first step of the process are regulated so as to obtain from 50 to 90 percent conversion of the aluminum charge. While the residence time necessary to give this conversion will depend upon the temperature, pressure and rate of agitation, it will generally be in the range of from 1 to 4 hours and frequently in the range of from 5 to 30 minutes.

Although it is not mandatory, the use of a hydrocarbon in step 1 of the process is often considered desirable because the organoaluminum halides are pyrophoric. Operating hazards are kept at a minimum if the concentration of organoaluminum halides is below 33 weight percent. As previously mentioned, the preferred hydrocarbons are those which have a boiling point above the boiling point of the organoaluminum compound being prepared. Since some of the products are solids, it is not always convenient or possible to operate in this manner. Various modifications can be made in the separation steps when hydrocarbons having different boiling points are utilized.

As described hereinabove, the unreacted organic halide is ordinarily removed from the reaction mixture prior to transfer of the organoaluminum halides to reactor 26. However, this separation step is not mandatory, and in some instances this step of the process is omitted. Thus, in some cases it is desirable to charge an organic halide to reactor 26 since different types of products can be prepared by proceeding in this manner. It is to be understood, therefore, that stripper 22 can be omitted in some types of operations.

The reaction of an organoaluminum halide with an alkali metal to produce compounds such as trialkyl-, tricycloalkyl-, and triarylaluminum can be illustrated by the following equations in which sodium is used as the alkali metal:

$$3R_2AlX + 3Na \rightarrow 2R_3Al + Al + 3NaX \quad (2)$$
$$3RAlX_2 + 6Na \rightarrow R_3Al + 2Al + 6NaX \quad (3)$$

wherein R and X are as defined hereinbefore. It is to be understood that the other alkali metals, such as lithium, potassium, rubidium and cesium can be employed as well as magnesium, calcium and zinc. The above equations represent the reactions which occur in the third step of the process as described above, i.e., the reactions in reactor 26. Optimum results are obtained when using one mol of alkali metal per mol of halide ion or one-half mol of calcium, magnesium or zinc per mol of halide ion in the reaction mixture. Less than this amount of metal will result in the formation of somewhat less than the theoretical amount of the organometal product, and an excess of the metal will react with the organometal, thereby reducing the ultimate yield.

Compounds corresponding to the formula $MR_x$ can also be produced in the presence of an organic halide if the amounts of organoaluminum halide, organic halide and metal are charged in the correct proportions. This latter type of reaction can be expressed by the following general equation, in which sodium is the metal utilized and the mixture of organoaluminum halides ($R_2AlX$ and $RAlX_2$) is represented by the formula $R_3Al_2X_3$:

$$R_3Al_2X_3 + 6Na + 3RX \rightarrow 2R_3Al + 6NaX \qquad (4)$$

wherein R and X are as previously defined. In the case of the organoberyllium halide which is present only in the form of the monohalide, the reaction is represented by the following equation:

$$RBeX + 2Na + RX \rightarrow R_2Be + 2NaX \qquad (5)$$

Compounds other than organometals, e.g., organoaluminum monohalides, can also be prepared in step 3, i.e., in reactor 26, of this process. These compounds are produced by the interaction of an alkali metal, magnesium, calcium or zinc and an organic halide on the organoaluminum dihalide contained in the reaction mixture recovered from step 1 of the process, i.e., from reactor 10. Optimum results are obtained when the quantities of reactants utilized are regulated in the proportions shown in the following equation:

$$RAlX_2 + Mg + RX \rightarrow 2R_2AlX + MgX_2 \qquad (6)$$

wherein R and X are as previously defined. It is to be understood that the reaction mixture from reactor 10 will contain some organoaluminum monohalide, the product being prepared in accordance with the above-described reaction. It is noted, however, that this reaction is applicable only to the preparation of organic monohalides of the metals aluminum, gallium, indium and thallium.

In carrying out the reaction in reactor 26, it is preferred that the metals be charged thereto as finely divided dispersions in a hydrocarbon. However, good results can be obtained when magnesium, calcium or zinc are used either with or without a hydrocarbon. When employing an alkali metal, it is preferred that the hydrocarbon have a boiling point higher than the melting point of the alkali metal. The temperature in vessel 29 can thus be readily maintained above the melting point of the alkali metal so that on stirring the mixture there is produced a fine dispersion of metal in the hydrocarbon. When magnesium, calcium or zinc are used, the metal is generally employed in the form of a powder which can be readily dispersed in the hydrocarbon by stirring. Hydrocarbons which can be used are the same as those which may be employed in reactor 10, and it is preferred that the identical hydrocarbon be utilized in both steps.

The temperatures and pressures in reactor 26 are, in general, the same as those in reactor 10. When a gaseous organic halide is used, pressures above atmospheric are particularly advantageous. The residence time is generally in the range of from 1 to 6 hours, and preferably is less than 4 hours. The metal charged to reactor 26 is preferably entirely consumed, and the conditions are generally regulated so as to accomplish this result. When an organic halide is utilized in step 3 of the process of this invention, reactor 26 is provided with an inlet whereby the required quantity of organic halide can be introduced.

When step 3 of the process of this invention occurs in accordance with reactions expressed in Equations 4, 5 or 6, it is noted that no free metal is formed. The metal halide which forms is present as a precipitate and can be easily separated by centrifugation, filtration or the like. The organometal can be separated from the hydrocarbon by any suitable means such as distillation. If the boiling point of the hydrocarbon is lower than that of the reaction product, it is taken overhead and the residue contains the organometallic compounds. The organometallic compound can be purified by any suitable means, such as distillation or crystallization, depending upon the nature of the product.

For the successful operation of the process of this invention, it is important that no extraneous materials, which will retard or inhibit the reaction, be present in the organic halide, the metal or the hydrocarbon. In this regard it is desirable that carbon dioxide, oxygen and moisture be excluded from all parts of the process where organometallic compounds are being produced, separated from other reaction products, or otherwise being treated. The organometallic compounds which are produced in accordance with this invention are stored in an inert atmosphere such as nitrogen.

For a more comprehensive understanding of the invention, reference may be had to the following illustrative example which is not intended, however, to be unduly limitative of the invention.

*Example*

A system similar to that shown in the drawing is utilized in a continuous process for preparing triethylaluminum. The entire system is initially purged with purified nitrogen which is thereafter allowed to flow through the system at a slow rate so as to maintain an inert atmosphere therein. Reactor 10 is charged with ethyl chloride, aluminum turnings and cetane at the following rates:

| Parts/Hour | New | Recycle | Total |
| --- | --- | --- | --- |
| Ethyl chloride | 138.5 | 55.0 | 193.5 |
| Aluminum | 20.5 | 33.5 | 54.0 |
| Cetane | 35.5 | 764.5 | 800.0 |

A trace of iodine is added initially in order to initiate the reaction. The reaction temperature is maintained between 150 and 180° C. while the pressure in the reactor is equal to the vapor pressure of ethyl chloride at that temperature. The reaction mixture is continuously stirred, and the reactor contents are cooled by suitable cooling means, as required, to maintain the reaction temperature in the aforementioned range. Seventy percent conversion of the aluminum charge is obtained with a residence time of 1 hour.

Reaction mixture is withdrawn from reactor 10 at the rate of 1037 parts per hour and passed through a suitable filter. Aluminum metal is recovered from the filter at the rate of 15.5 parts per hour and recycled to reactor 10. The remainder of the material, i.e., ethyl chloride, cetane and mixture of ethylaluminum dichloride and diethylaluminum chloride is passed from the filter into a stripper. Ethyl chloride is taken overhead from the stripper and recycled to reactor 10 at the rate of 55 parts per hour. A mixture of ethylaluminum halides and cetane are taken from the bottom of the stripper at the rate of 948.5 parts per hour and introduced into reactor 26. A dispersion of finely divided sodium in cetane is charged to the reactor at a rate of 549 parts per hour from vessel 29 wherein the dispersion is prepared. In preparing the dispersion, 49 parts per hour of sodium and 500 parts per hour of cetane are charged to the vessel. The contents of the vessel, which are maintained at a temperature between 120 and 160° C., are continuously stirred. A 100 percent conversion of the materials in the vessel is obtained with a residence time of 1 hour. The reaction mixture in reactor 26 is maintained at a temperature between 120 and 160° C. and at atmospheric pressure. The residence time of the reactant materials in reactor 26 is one hour.

The reaction mixture, which is removed from reactor 26 at the rate of 1489.5 parts per hour and then passed through a suitable filter, contains triethylaluminum, cetane, aluminum and sodium chloride. In the filter, the aluminum and sodium chloride are separated out at the rate of 140 parts per hour and then introduced into a treating vessel. Cold water is added to the treating vessel at the rate of 500 parts per hour, and the contents thereof, maintained at room temperature, are continuously stirred. The contents of the treating vessel are removed therefrom at the rate of 640 parts per hour and then passed through a suitable filter. In the filter, aluminum is separated from the aqueous solution of sodium chloride at the rate of 18 parts per hour. After passing through a drier, the aluminum is recycled to reactor 10 at the rate of 18 parts per hour. The sodium chloride solution is removed from the filter at the rate of 617 parts per hour. The remainder of the material recovered from the first of the above-mentioned two filters, which contains triethylaluminum and cetane, is passed into a fractionator at the rate of 1339.5 parts per hour. In the fractionator, triethylaluminum is distilled overhead at the rate of 75 parts per hour and then passed to suitable storage facilities. Cetane which boils at a higher temperature than triethylaluminum is withdrawn from the bottom of the fractionator at the rate of 1264.5 parts per hour. Of this amount of cetane 764.5 parts per hour are returned to reactor 10 while 500 parts per hour are recycled to vessel 29. In the process as described above, 97.5 percent of the cetane is recovered, and a 94 percent ultimate yield of triethylaluminum is obtained. Differences between the amounts of materials charged to and withdrawn from the several pieces of equipment as discussed above are primarily due to mechanical losses.

It will be apparent to those skilled in the art that various modifications of the invention can be made upon study of the foregoing disclosure. Such modifications are believed to be clearly within the spirit and scope of the invention.

We claim:

1. A continuous process for the preparation of an organometal corresponding to the formula $MR_x$, wherein M is a metal selected from the group consisting of aluminum, gallium, beryllium, indium and thallium, R is a member selected from the group consisting of an alkyl radical, a cycloalkyl radical, an aryl radical and combinations of the radicals, and $x$ is equal to the valence of the metal M, which comprises continuously introducing into a first reaction zone one of said metals M and an organic halide corresponding to the formula RX, wherein R is as indicated above and X is a halogen, the amount of said organic halide so introduced being in excess of that to be reacted with said metal M in said first reaction zone and said excess of said organic halide being sufficient for the reaction occurring in a second reaction zone as hereinafter described; reacting said metal M with said organic halide in said first reaction zone under reaction conditions so as to provide a reaction mixture comprising an organometal halide of one of said metals M and said organic halide; continuously withdrawing said reaction mixture from said first reaction zone; separating any unreacted metal M from said reaction mixture; passing said reaction mixture free of said metal M into a second reaction zone; continuously introducing into said second reaction zone a dispersion of finely divided metal M′ in a hydrocarbon, liquid and inert under conditions of the process, said metal M′ being selected from the group consisting of alkali metals, magnesium and zinc; reacting under reaction conditions in said second reaction zone said metal M′ with said organometal halide of one of said metals M and said organic halide contained in said last mentioned reaction mixture; continuously withdrawing from said second reaction zone a second reaction mixture comprising an organometal corresponding to the formula $MR_x$ and a halide of said metal M′; separating said halide of said metal M′ from said second reaction mixture; and recovering from said second reaction mixture free of said halide of said metal M′ an organometal corresponding to the formula $MR_x$.

2. A process in accordance with claim 1 wherein any of said unreacted metal M separated from the reaction mixture withdrawn from said first reaction zone is recycled to said first reaction zone.

3. A process in accordance with claim 1 wherein the temperature in said first and second reaction zones is maintained between 90 and 200° C.

4. A process in accordance with claim 1 wherein said second reaction mixture free of said halide of said metal M′ is passed into a distillation zone; said liquid hydrocarbon is withdrawn from one end of said distillation zone; and an organometal corresponding to the formula $MR_x$ is withdrawn from the other end of said distillation zone.

5. A process in accordance with claim 1 wherein an alkyl halide is reacted with aluminum in said first reaction zone and a mixture of alkylaluminum halides and said alkyl halide are reacted with said dispersion of finely divided metal M′ in said second reaction zone.

6. A process in accordance with claim 5 wherein said alkyl halide is ethyl chloride and said alkylaluminum halides are ethylaluminum chlorides.

7. A process in accordance with claim 5 wherein said finely divided metal is an alkali metal.

8. A process in accordance with claim 7 wherein said alkali metal is sodium.

9. A process in accordance with claim 8 wherein said sodium is dispersed in hexadecane.

10. A process in accordance with claim 5 wherein said finely divided metal is magnesium.

References Cited in the file of this patent

UNITED STATES PATENTS

| | | |
|---|---|---|
| 2,691,668 | Ziegler et al. | Oct. 12, 1954 |
| 2,863,894 | Smith | Dec. 9, 1958 |

FOREIGN PATENTS

| | | |
|---|---|---|
| 911,731 | Germany | May 17, 1954 |

OTHER REFERENCES

Grosse et al., Journal of Organic Chemistry, vol. 5, 1940, pages 106–119.

Hansley, I. and E. Chem., vol. 43, No. 8, 1951, pages 1759–1760.